Nov. 1, 1960   A. B. FREEMAN ET AL   2,958,621
METHOD OF MAKING A DOME-LIKE BODY OF
PLASTIC REINFORCED FIBERS
Filed Nov. 20, 1956   2 Sheets-Sheet 1
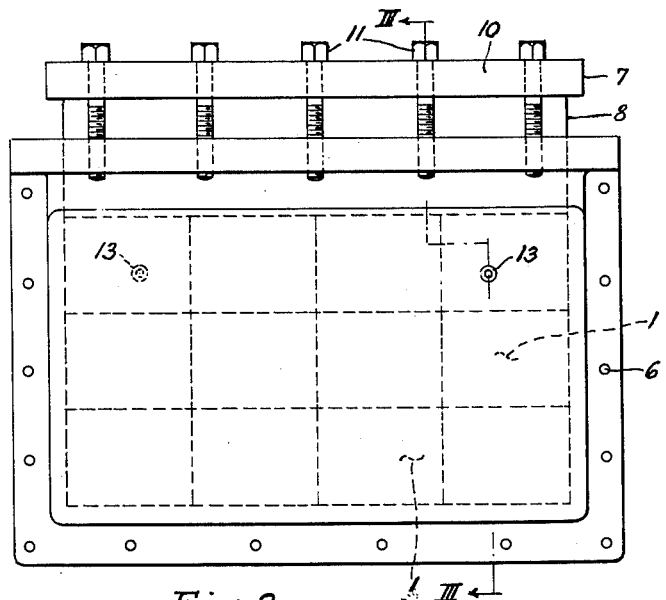
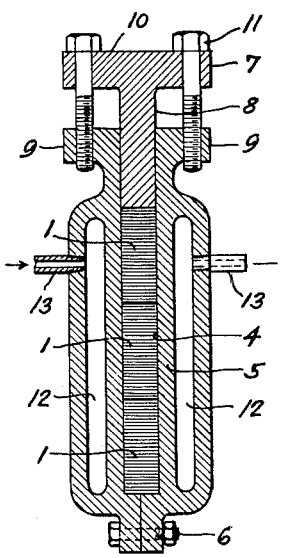
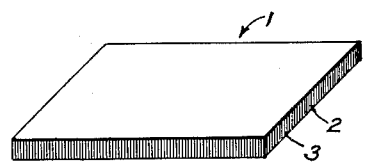
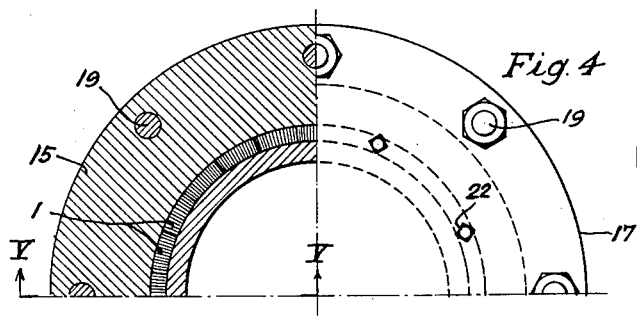
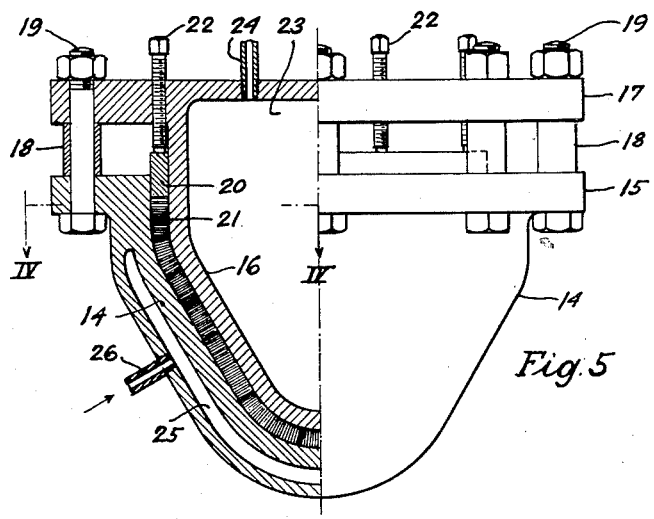
INVENTOR.
Arnold B. Freeman,
Bernard D. Raffel &
BY Roland A. Tripp
ATTORNEY Nov. 1, 1960

A. B. FREEMAN ET AL 2,958,621

METHOD OF MAKING A DOME-LIKE BODY OF
PLASTIC REINFORCED FIBERS

Filed Nov. 20, 1956

INVENTOR.
Arnold B. Freeman,
Bernard D. Raffel &
BY Roland A. Tripp

Oldham
ATTORNEY

2,958,621

METHOD OF MAKING A DOME-LIKE BODY OF PLASTIC REINFORCED FIBERS

Arnold B. Freeman and Bernard D. Raffel, Akron, and Roland A. Tripp, Cuyahoga Falls, Ohio, assignors to Goodyear Aircraft Corporation, Akron, Ohio, a corporation of Delaware Filed Nov. 20, 1956, Ser. No. 623,421

1 Claim. (Cl. 154—110)

This invention relates generally to a method and apparatus for molding of fibrous material, and, more particularly, to the molding of shaped structures having parallel and aligned fibers by the use of modular slabs similarly formed.

The general object of the invention is to provide a method and apparatus for molding a homogeneous structure from a multiplicity of modular slabs of material formed of parallel fibers in a plastic binder medium, with the fibers aligned normal to the upper and lower slab faces.

A further object of the invention is to provide a method and apparatus for molding which is simple, efficient, and economical in operation.

Other objects and advantages of this invention will become apparent hereinafter as the description proceeds; the novel features, arrangements, and combinations being clearly delineated in the specification, as well as in the appended claim.

In the drawings:

Fig. 1 is a perspective view of a typical modular molding block as used in the method and apparatus of the invention;

Fig. 2 is a front elevation of one embodiment of a molding apparatus incorporating the invention for molding planar structures;

Fig. 3 is a sectional view taken along line III—III of Fig. 2;

Fig. 4 is a one half top view, the left side of which is sectional taken along line IV—IV of Fig. 5, of a second embodiment of a molding apparatus incorporating the invention for molding dome-shaped structures;

Fig. 5 is a side view, the left side of which is sectional taken along line V—V of Fig. 4;

Figure 6:
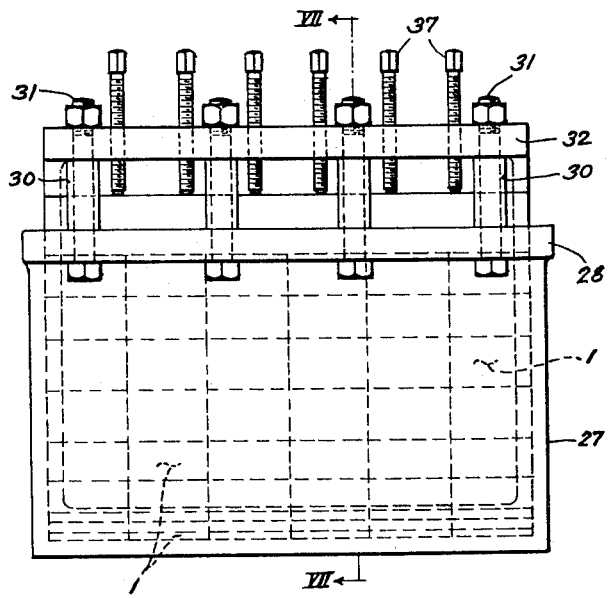
Fig. 6 is a front elevation of a third embodiment of a molding apparatus incorporating the invention for molding U-shaped structures.

In Fig. 1 is shown a typical modular slab 1 formed of fibers 2 in a plastic medium binder 3. The fibers 2 are mutually parallel and also aligned normal to the upper and lower faces of the slab 1. Due to the nature of methods of manufacturing slabs having the described fiber orientation (such as are described in our copending application Serial No. 623,422, filed November 20, 1956, now U.S. Patent No. 2,943,968), the slabs are provided in flat sections which are relatively small in size and are used as "building blocks" or modular units in the method and apparatus of the invention in a manner more evident as the description proceeds. It will be understood that the slab 1 need not be rectangular as shown, but may be of any suitable configuration.

Figs. 2 and 3 show one embodiment of the method and apparatus of the invention. A rectangular mold cavity 4 is formed by a mold case 5 made of two halves connected by bolts 6, and which has one side thereof open to receive a T-shaped bar 7. A vertical leg 8 of the bar 7 penetrates into the mold cavity 4 in close-fitting and sealing relation. The mold case 5 has opposed longitudinal flanges 9 extending the length of the case as seen in Fig. 2. The horizontal section 10 of the bar 7 is adapted to accommodate bolts 11 which are threaded into the flanges 9. Exterior of the mold cavity 4 of the mold case 5 and integral therewith are chambers 12 into which a heating medium such as steam is introduced through inlet pipes 13 to heat the mold during the cure step. It will be understood that other methods of supplying heat may be utilized, such as electrical heat sources and the like.

In the method of the invention, the modular slabs 1 of Fig. 1 are loaded into the mold cavity 4 in succession through the top opening thereof with the fiber elements of each slab extending crosswise of the mold cavity and normal to the adjacent mold walls defining the cavity to form a slab lay-up in neutral abutting relation of the modular slabs within the mold. The bar 7 is then placed into position and the bolts 11 tightened to apply pressure to the exposed edges of the slab lay-up and force adjacent slab edges throughout the lay-up into mutual pressure contact. While the slab lay-up is in such compressed state, the mold is heated to cure the slab lay-up resulting in a homogeneous slab formed of parallel fibers normal to the slab faces. It will be apparent that with some plastic binder mediums, it may be desirable not to have a compressive condition while under cure. In such cases, after the slabs have been forced together, the bolts 11 may be slackened as much as is desirable preparatory to the cure step. This variation of method, of course, applies also to the other embodiments of the invention hereinafter described. It may be desirable, where larger planar slabs are molded, to construct the mold case 5 in two or more sections to facilitate the removal of the molded product from the mold.

Figs. 4 and 5 illustrate another embodiment of the method and apparatus of the inventions. A female mold shell 14 of dome-shape is shown having a circumferential flange 15. Nestably coengaging the female shell 14 is a male mold shell 16 of similar dome-shape having a circumferential flange 17. The male and female shells 16 and 14 are held in spaced relation by spacer bushings 18 through which clamping bolts 19 pass. An annular pressure ring 20 is closely fitted and sealingly penetrates into the mold space 21 formed between the male and female shells 16 and 14. Adjustment screws 22 engage the upper surface of the ring 20 and are threaded into the flange 17 to enable the ring 20 to be controllably advanced into the mold cavity 21. The male shell 16 has a cavity 23 having an inlet pipe 24 through which a heating fluid can be supplied for the cure step. Furthermore, the female shell 14 is provided with a space 25 into which a heating fluid can be introduced through an inlet pipe 26.

In the method of the invention, the modular slabs 1 are laid upon and conformed to the mold face of the female shell 14, the male shell 16 and the ring 20 are positioned in place, and then the bolts 19 tightened. It will be understood that the slab lay-up may be made on the male mold face and the female then placed thereon. As the adjustment screws 22 are brought to bear on the ring 20, the compressive force exerted on the peripheral edge of the slab lay-up is transmitted throughout the assembly to effect mutual pressure contact between all the modular slabs 1. As previously described in connection with Figs. 2 and 3, heat may then be applied for the cure step of the process.

Figure 7:
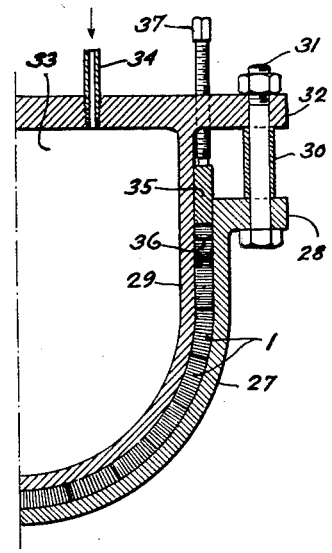
Fig. 7 is a one-half sectional view taken along line VII—VII of Fig. 6.

In the Figs. 6 and 7 a U-shaped female mold shell 27 is shown having longitudinally extending flanges 28 on each vertical leg of the U-shape. A male mold shell 29 nestably coengages the female shell 27 and is spaced therefrom by spacer bushings 30 surrounding clamping bolts 31, which in turn pass through a flange 32 on the male shell 29. A longitudinal chamber 33 is shown within the male shell 29 into which heating fluid can be introduced by means of an inlet pipe 34. An exterior heating chamber (not shown) may be provided in the female shell 27 if desired in the same general manner as shown in the embodiment of Figs. 4 and 5.

A pair of rectangular bars 35 closely fit and sealingly engage respective rectangular openings in the mold cavity 36 formed by the spaced arrangement of the male and female shells 29 and 27. Adjustment screws 37 engage the upper surface of the bars 35 to progressively advance the bars into the mold cavity.

In the method of the invention, the modular slabs 1 are built-up on the mold face of the female shell 27 and the mold assembled. The slab lay-up may be made on the male mold surface and the female mold placed thereon as an alternative if desired. Penetration of the bars 35 into the mold cavity 36 forces the slabs 1 into mutual pressure contact creating a compressive condition throughout the slab lay-up preparatory to the cure step.

Figure 8:
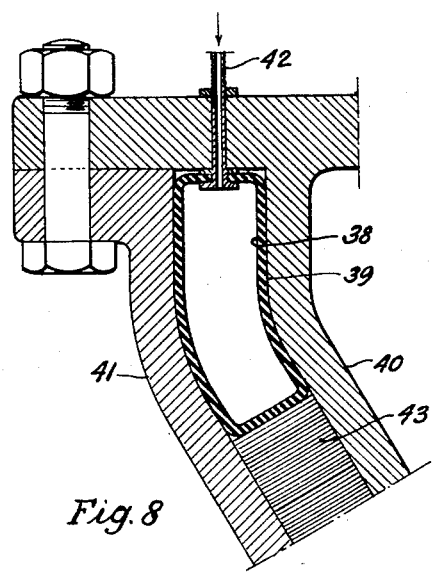
Fig. 8 is a fragmentary vertical sectional view of a modification of the mold pressure-applying device.
Figure 9:
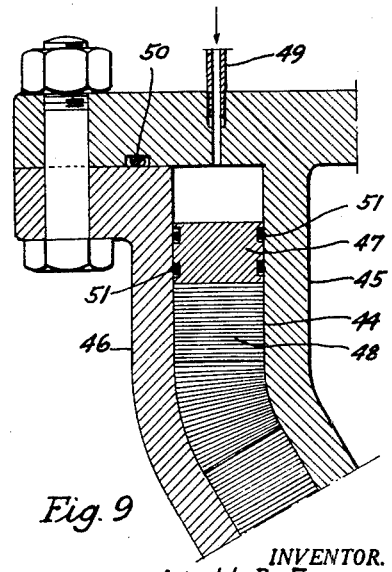
Fig. 9 is a fragmentary vertical sectional view of another modification of the mold pressure-applying device.

In the embodiments hereinbefore described, it will be apparent that other arrangements can be used to replace the T-bar of Fig. 3, the annular ring 20 of Fig. 5, or the rectangular bars 35 of Fig. 7. One embodiment of such a pressure barrier is shown in Fig. 8 wherein an extensible bag 38 is shown within a mold cavity 39 formed by mold parts 40 and 41. The bag 38 is inflated through a suitable inlet tube 42 to create the pressure required within the slab lay-up 43. Another embodiment is illustrated in Fig. 9 wherein a mold cavity 44 is formed by mold parts 45 and 46 and a piston-like member 47 is shown which is forced against the slab lay-up 48 by a suitable fluid supplied through an inlet pipe 49. Additional sealing arrangements are shown in an O-ring 50 between the mold parts 45 and 46 and by O-rings 51 on the piston-like barrier 47.

The application of the pressure barrier embodiments illustrated in Figs. 8 and 9 to box, dome, and U-shaped molds previously described will be evident. Either of these pressure barriers may replace, with but slight rearrangement, the vertical T-leg 7 of Figs. 2 and 3, the annular ring 20 of Fig. 5, or the rectangular bars 35 of Figs. 6 and 7.

It may be desirable in some cases to form a homogeneous structure in which the fibers are closely packed with but a minimum of resin present, and still utilize modular slabs, which necessarily, for say production reasons, have a higher ratio of resin to fiber than in the final product. To accomplish this, the three pressure barriers hereinbefore described in Figs. 2 and 3, 4 and 5, and 6 and 7, are proportioned to provide a clearance between the barrier and the mold walls, thereby permitting the excess resin to squeeze by the barrier during the compression stage and thusly further densify the slab lay-up. In the case of use of a flexible barrier, such as that of Fig. 8, vent grooves are provided in the sidewalls adjacent the barrier to harbor the overflow of excess resin.

In the method and apparatus of the invention, although as hereinbefore described, the modular slabs are placed in a single thickness arrangement in the mold cavity, it is obvious that the slab lay-up can be in multiples of the thickness of the modular slabs, so that two or more layers can be formed into a homogeneous structure. Furthermore, if desired in a particular final structure, thin layers of fabric may be placed in the mold to cover one or both faces of the product by providing an appropriately increased molding cavity thickness.

It will now be seen that by the method and apparatus of the invention, individual modular slabs may be molded to form a homogeneous final structure to achieve the objects of the invention hereinbefore enumerated.

While certain representative embodiments and details have been shown for the purpose of illustrating the invention, it will be apparent to those skilled in this art that various changes and modifications may be made therein without departing from the spirit or scope of the invention.

We claim:

That method of making a dome-like body of plastic reinforced fibers with all of the fibers extending substantially normal to the inner and outer faces thereof and with their ends exposed at said faces which comprises forming flat modular slabs of substantially parallel fibers in a curable plastic binder medium, said fibers being each of a length substantially equal to the thickness of the slab and extending through said slab normal to its opposite faces, and said modular slabs being of such shape in cross-section normal to the fibers as to permit assembling in the desired dome-like form, assembling the modular slabs in edge to edge relation to the approximate dome-like shape with the fibers of adjacent modular slabs in substantially parallel relation to one another, confining the assembled slabs between nested mold members held in spaced relation to define a cavity having the desired dome-like shape and terminating at the large open end of the dome-like shape in a parallel walled cylindrical opening, inserting a cylindrical plunger member into said opening to close the opening, applying axial pressure to the plunger member to compact the assembled slabs, and applying heat to the assembled material to cure the plastic binder.

References Cited in the file of this patent

UNITED STATES PATENTS

| | | |
|---|---|---|
| 365,743 | Hanson | June 28, 1887 |
| 591,329 | Densmore | Oct. 5, 1897 |
| 1,467,311 | Elliott | Sept. 11, 1923 |
| 1,802,852 | Vincke | Apr. 28, 1931 |
| 2,495,640 | Muskat | Jan. 24, 1950 |
| 2,639,252 | Simon et al. | May 19, 1953 |
| 2,758,951 | Case | Aug. 14, 1956 |
| 2,762,739 | Weiss | Sept. 11, 1956 |
| 2,805,974 | Brucker | Sept. 10, 1957 |

FOREIGN PATENTS

| | | |
|---|---|---|
| 684,086 | Great Britain | Dec. 10, 1952 |
| 181,549 | Austria | Mar. 25, 1955 |